J. C. McLELAND.
CALCULATING MACHINE.
APPLICATION FILED MAR. 1, 1906. RENEWED SEPT. 14, 1908.
918,766.
Patented Apr. 20, 1909.
3 SHEETS—SHEET 1.
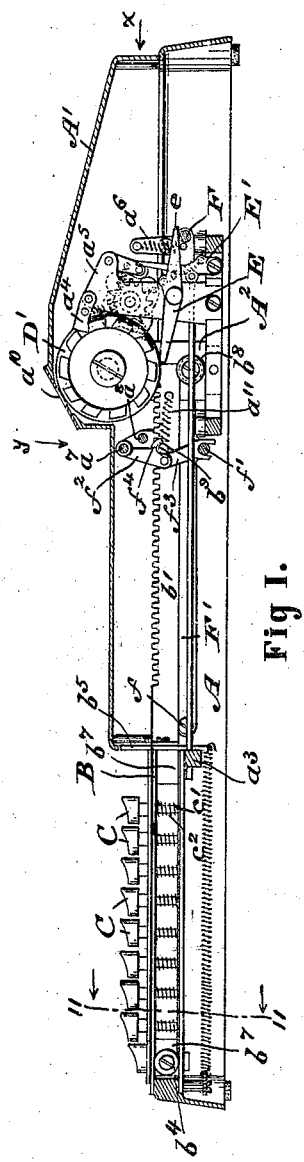
Fig I.
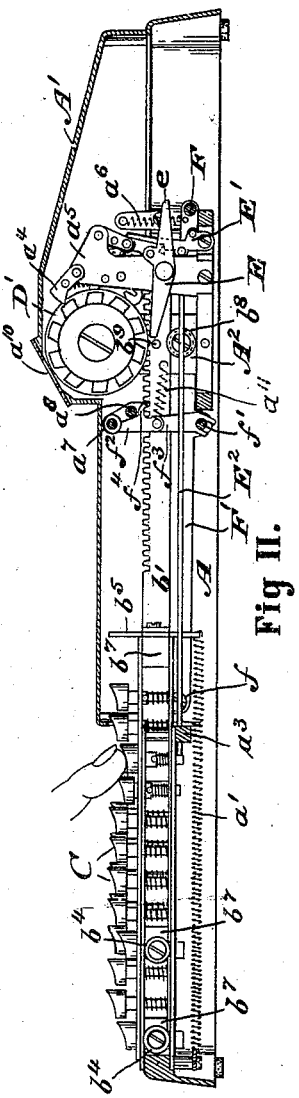
Fig II.
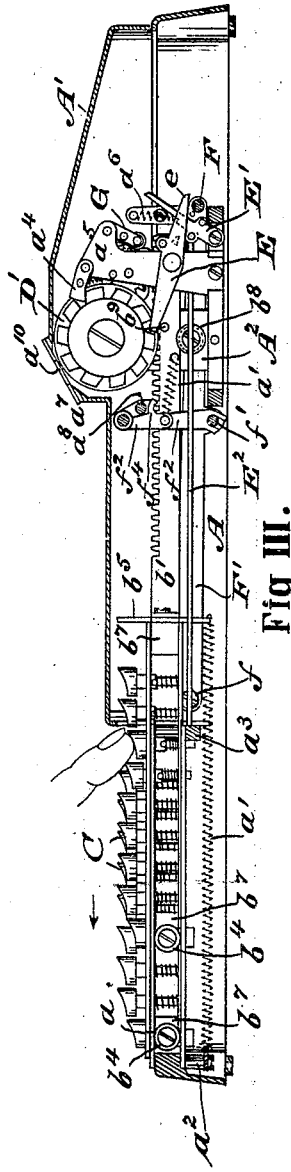
Fig III.
WITNESSES:
G. W. Saywell
Jno. F. Oberlin
INVENTOR.
John C. McLeland
BY
J. D. Fay
ATTORNEY.

J. C. McLELAND.
CALCULATING MACHINE.
APPLICATION FILED MAR. 1, 1906. RENEWED SEPT. 14, 1908.
918,766.
Patented Apr. 20, 1909.
3 SHEETS—SHEET 2.
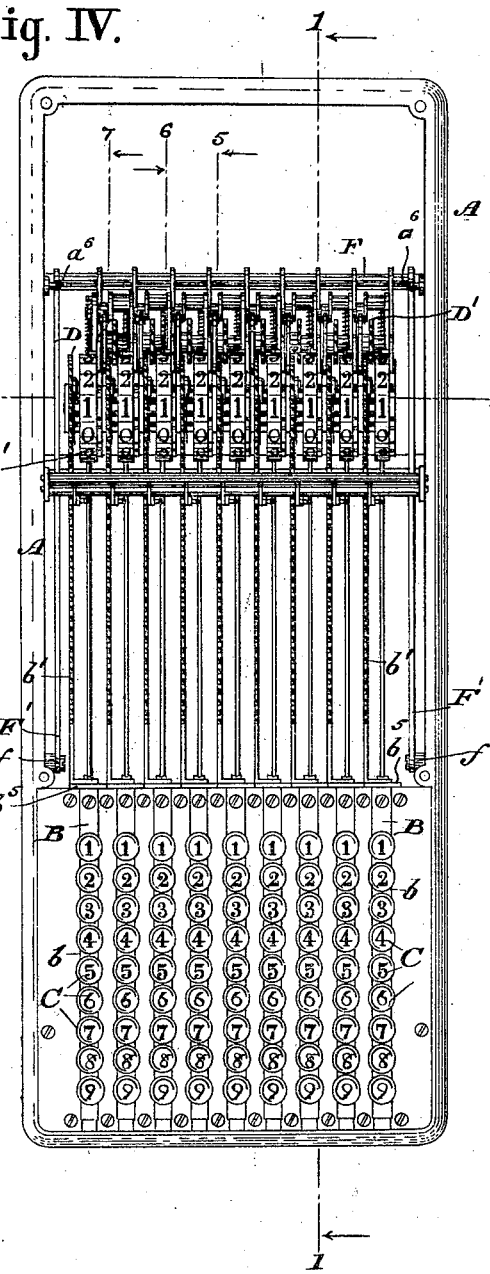
Fig. IV.
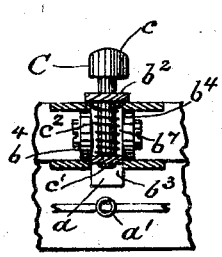
Fig. XI.
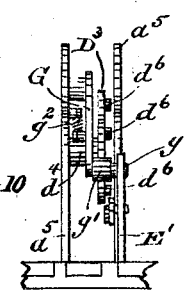
Fig. XII.
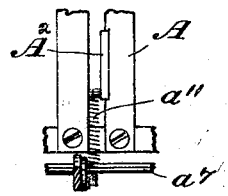
Fig. XIII.
WITNESSES:
INVENTOR.
John C. McLeland
BY
ATTORNEY.

J. C. McLELAND.
CALCULATING MACHINE.
APPLICATION FILED MAR. 1, 1906. RENEWED SEPT. 14, 1908.
918,766.
Patented Apr. 20, 1909.
3 SHEETS—SHEET 3.
Fig. V.
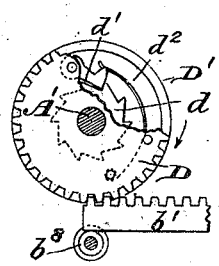
Fig. VI.
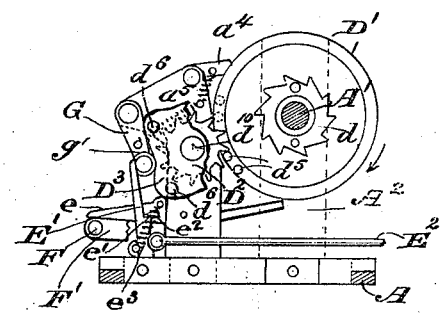
Fig. VII.
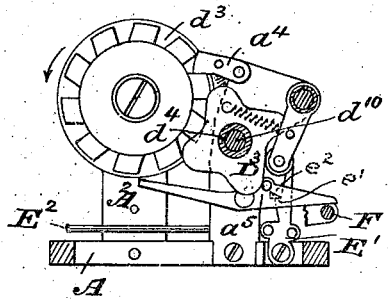
Fig. VIII.
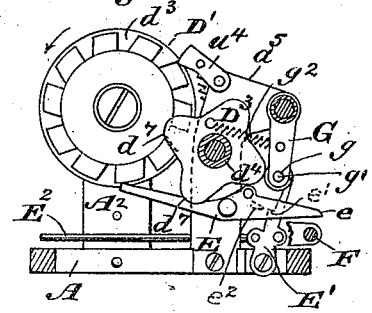
Fig. IX.
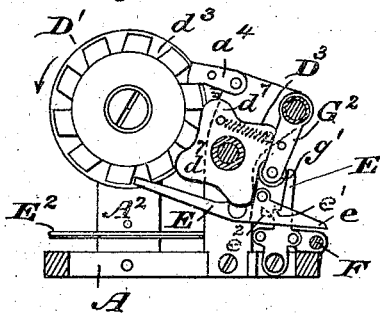
Fig. X.
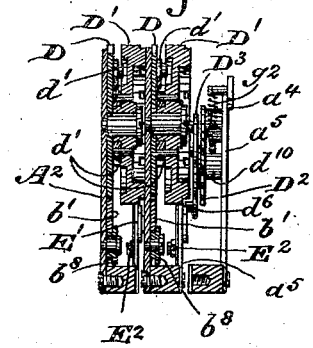
WITNESSES:
G. W. Saywell
Jno. F. Oberlin
INVENTOR.
John C. McLeland
BY
J. B. Fay
ATTORNEY.

UNITED STATES PATENT OFFICE.

JOHN C. McLELAND, OF CLEVELAND, OHIO.

CALCULATING-MACHINE.

No. 918,766. Specification of Letters Patent. Patented April 20, 1909.

Application filed March 1, 1906, Serial No. 303,580. Renewed September 14, 1908. Serial No. 453,012.

*To all whom it may concern:*

Be it known that I, JOHN C. MCLELAND, a citizen of the United States, and resident of Cleveland, county of Cuyahoga, and State of Ohio, have invented a new and useful Improvement in Calculating-Machines, of which the following is a specification, the principle of the invention being herein explained and the best mode in which I have contemplated applying that principle, so as to distinguish it from other inventions.

My invention relates to mechanical devices for performing the processes of addition and multiplication, and particularly to that class of such devices in which printing means for recording the figures are omitted.

The object of said invention is to provide a device of the above-mentioned class which by virtue of its construction will be comparatively inexpensive in cost of manufacture as well as simple in operation.

The said invention consists of means hereinafter fully described and particularly set forth in the claims.

The annexed drawings and the following description set forth in detail certain mechanism embodying the invention, such disclosed means constituting but one of various mechanical forms in which the principle of the invention may be used.

In said annexed drawings: Figures I, II and III represent longitudinal vertical sections all taken upon the same plane I—I, indicated in Fig. IV, the latter figure representing a plan of the device with the inclosing top-casing removed. The said Figs. I, II and III show the parts of the mechanism in three different positions, corresponding with three different stages in its operation. Figs. V and VI represent detail vertical longitudinal broken sections of the calculating wheel mechanism viewed in the directions indicated by the arrows, taken upon the planes indicated by lines 5—5 and 6—6, Fig. IV. Figs. VII, VIII and IX represent detail vertical longitudinal sections with parts broken away, taken upon the plane indicated by line 7—7, Fig. IV and viewed in the direction indicated by the arrows. Fig. X represents a vertical transverse section of a portion of the calculating mechanism taken upon the plane indicated by line 10—10, Fig. IV. Fig. XI represents a detail transverse section as viewed in a slightly enlarged scale taken upon the plane indicated by line 11—11 Fig. I. Fig. XII represents an end elevation of a portion of the wheel mechanism viewed in the direction indicated by arrow $x$ Fig. I; and Fig. XIII represents a plan view of a part of the device viewed in the direction indicated by arrow $y$, Fig. I.

Upon a suitable rectangular frame A are mounted a plurality of longitudinally reciprocable parallel actuating-bars B each consisting of a key-holding portion $b$ and a rack $b'$. The key-holding portion $b$ comprises two members, an upper flat bar $b^2$ and a similar lower flat bar $b^3$, Fig. XI, secured to each other by means of separators $b^7$ and adapted to run in suitable slideways $a$ formed in the frame. At the front end of each such key holding portion is mounted a vertical piece $b^5$, upon the front face of which, in turn, is secured the rack-bar $b'$ which forms the forward part of the actuating bar B and whose function will be hereinafter fully explained. Reciprocation of the bars B is rendered easy by providing each key-holding portion $b$ thereof with anti-friction rollers $b^4$ adapted to run in the slideways $a$ above mentioned, and by mounting in the forward part of the frame other anti-friction rollers $b^6$ upon which the rack-portion $b'$ of such bar rests.

Mounted upon the key-holding portion $b$ of each actuating-bar B, is a series of nine keys C, consecutively numbered from one to nine in the direction of reciprocation of their respective bars. Each such key is mounted as shown, being formed with a contact-member $c$ and a downwardly extending shank or stud-portion $c'$, Fig. XI. Springs $c^2$ normally maintain the keys in the position in which the lower ends of the shanks $c'$ do not project below the lower plane of the actuating bars, as shown in Fig. I. It will be evident, however, that by manually depressing the keys, such shanks may be made to project downwardly from the several actuating-bars at various points longitudinally thereof depending upon which key is operated. When thus depressed any key is adapted to limit the forward reciprocating stroke of the bar in which it is mounted by virtue of its engagement with a stop-bar $a^2$ disposed transversely of the frame and intersecting the path of movement of the lower stud-portions of the keys. Keys C are not only adapted to thus limit the forward stroke of the bars but they also serve as the means whereby such bars are actuated; in other words the depression of any key with the effect just described is merely incidental to the pushing of the same forward together with the particular bar in which such key is mounted. In order to render this double operation of the keys easy, each is formed with a high front as appears in Figs. I, II, and III, whereby a single movement of the finger accomplishes the full actuation of the corresponding mechanism. Actuating bars B are normally retained in the forward position shown in Fig. I, and, when in any other position, are immediately upon being released retracted to such normal position by means of tension springs $a'$ attached in the rear to the frame A and in the front to the lower ends of vertical pieces $b^5$ of the key-holding portions $b$ of the bars.

Each rack-bar $b'$ engages a gear D forming one of the members of a series of calculating mechanisms which I shall now proceed to describe. One such calculating mechanism is provided in connection with each reciprocatory bar B, there being as many bars and corresponding calculating mechanisms as there are orders or denominations in the largest number which the device is designed to register. Furthermore a carrying mechanism is provided intermediate of each calculating mechanism whereby tens are carried from one denomination to the next higher.

Each gear D above mentioned is rotatably mounted upon a bearing pin $A'$ mounted in a standard $A^2$ fixed to a frame. In addition to this gear each calculating mechanism includes a number-wheel $D'$ independently mounted upon the same pin $A'$ as the gear but adapted to be connected with such gear so as to be rotated thereby upon the forward stroke of the corresponding actuating-bar B. This connection is effected through a ratchet wheel $d$ secured to, or forming part of, the number wheel, Fig. VI, and a pawl $d'$ on the adjacent face of gear wheel D adapted to be actuated by a spring $d^2$ to effect the desired engagement. During the rearward stroke of actuating bar B, the number-wheel $D'$ is locked in place by a pawl $a^4$ mounted upon a standard $a^5$ forming part of the fixed frame portion of the machine. This pawl engages notches $d^3$ formed in the periphery of the number wheel as shown. Rotatably mounted upon a stud $d^{10}$ supported by a standard $a^5$ is a spur-wheel $D^2$ so disposed as to cause its teeth to be engaged by two pins $d^5$ mounted on the face of number-wheel $D'$ and serving as successive gear teeth. The arrangement is such that every complete revolution of a number-wheel will effect the rotation of the corresponding spur-wheel $D^2$ through an arc of ninety degrees. Such rotation is directly communicated to a cam-wheel $D^3$ fixedly mounted upon a sleeve $d^4$ with which spur-wheel $D^2$ is provided. Such cam-wheel is formed with four cam portions $d^7$ $d^7$ and is provided on its outer face with four angularly equidistant studs $d^6$. The purpose of the cams $d^7$ will appear later; the studs $d^6$ are adapted to engage the notches $d^3$ of the number-wheel of the calculating mechanism of the next higher denomination, Figs. IV and X, whereby a one-tenth revolution of such number-wheel is produced upon every quarter turn of cam wheel $D^3$. The several mechanical devices just described, by means of which motion is transmitted from one calculating mechanism to the next higher, I shall term the carrying mechanism.

In order to prevent the number wheels from being carried around by their own momentum after the completion of the operating stroke of the rack-bar, I provide means for locking said wheels against such continued movement at the proper time. To this end a locking-pawl E is provided for each number-wheel which is adapted to engage the notches $d^3$ and is provided with an extension $e$. This pawl is normally held out of engagement with the number-wheel by a holding pawl $E'$ provided with a shoulder $e'$ engaging a lug $e^2$ formed or secured upon pawl E, Fig. VI. A spring $e^3$ has one end secured to pawl E and the other to pawl $E'$ and tends to maintain the normal position of the two pawls, as shown in said Fig. VI. Having one end pivoted to the pawl $E'$ is a horizontal rod $E^2$ whose front end extends into the path of the shank of a key disposed in the key-holding portion of the corresponding bar B, as shown in Fig. I, in a manner such that said rod $E^2$ will be engaged and moved longitudinally by such key-shank at the end portion of the operative stroke of the actuating bar. Such movement, it will be readily seen, disengages or "knocks off" the holding-pawl $E'$ from its engagement with the locking-pawl E and allows the locking-pawl to engage the number-wheel. In order to restore such pawls E and $E'$ as may have been actuated as described, to their normal positions, I provide a transversely located restoring-bar F, which is the rear member of a rectangular frame $F'$ pivoted to the main frame at $ff$, Figs. I and IV. The rear end of this frame is normally kept elevated, so as to bear against extension $e$ of the several locking-pawls E, by means of tension springs $a^6$ $a^6$ attached to the frame $F'$ at either side, and to points on the machine frame A adjacent thereto. In said frame $F'$, intermediately of its ends and just in front of the calculating mechanisms as shown in Figs. I and IV, is secured a transverse rod $f''$; and hung upon a similar transverse rod $a^7$ mounted in the side members of machine frame A and above rod $f''$, is a series of toggles $f^2$ equal in number to the number of reciprocatory actuating bars B, and located adjacent to the rack-members of such bars. The lower members $f^3$ of such toggles pivotally engage the rod $f'$, and the upper members are each supplied with a hook $f^4$ disposed to normally engage a stud $b^9$ on rack-member $b'$. When in this position the toggle members are at an angle to each other as shown in Fig. I. As the actuating-bar is pushed forward, however, the toggle is straightened out and left in a position in which its pivotal centers are substantially alined, the stud $b^9$ being in the mean time released from hook $f^4$. The toggles are retained in the position just described, which I shall term their locking position, by means of springs $a^{11}$, whereby they are drawn against a stop-rod $a^8$ mounted in the machine-frame so as to lie parallel with rod $a^7$. The straightening out, accordingly, of any one of the toggles depresses the rear end of the frame F', as shown in Fig. II, and therefore removes bar F from contact with all of pawls E. The latter are thus free to move into engagement with their respective number-wheels when, at the end of the reciprocations of the actuating-bars, the holding pawls are, as has been previously described, "knocked off."

In order to prevent the number-wheels from moving beyond the proper point as a result of their momentum, when actuated by the mechanism of the next lower denomination during the carrying movement, I provide, adjacent to each cam-wheel $D^3$, a rocker-arm G, which is provided with a pin $g$ bearing a roller $g'$ adapted to be engaged by the cams of such wheel $D^3$, the pin itself extending laterally so as to be capable of striking the holding-pawl E' of the wheel mechanism of the next higher denomination, Fig. XII. A spring $g^2$ actuates arm G to retain roller $g'$ in contact with cam-wheel $D^2$. As the cam-wheel is rotated to bring one of the four cam-portions $d^7$ into position against roller $g'$, arm G is accordingly actuated outwardly and the pin $g$ borne thereby "knocks off" the holding pawl E' of the adjacent calculating mechanism. Each quarter revolution of the cam-wheel therefore effects the disengagement of the holding-pawl of the next denomination and allows the corresponding locking-pawl to engage and lock its corresponding number-wheel.

In the operation of my improved calculating machine, the desired key on the actuating-bar corresponding with the highest order of the number to be added, is selected and depressed, and is simultaneously pushed forward toward the rear of the machine until the shank of such key strikes the stop-bar $a^3$. The key is then released and the actuating-bar is returned to its normal position by spring $a'$. It will be noted that the length of the operating stroke of an actuating-bar is dependent upon the key selected and proportional to the number thereon. That is, the bar may be pushed for a given distance when, say, the key numbered 2 is selected, and when the key numbered 6 is selected may be pushed forward three times the previous distance. The number wheels are therefore rotated through fractions of their complete revolutions proportionate to the numbers on the key selected. Let it be assumed that a key numbered 3 is selected upon any one of the actuating-bars and the latter actuated as described. Immediately upon the forward movement of the bar, the toggle $f^2$ is caused to begin the downward movement of the frame F' by depressing the bar $f'$ so as to allow the holding-pawl E' of the calculating mechanism, corresponding to the actuating bar selected, to be actuated as will appear. During the early part of the stroke this frame will have reached the position illustrated in Fig. II in which the rod F is held in the depressed position. Near the end of the stroke the depressed key-shank encounters the "knock off" rod $E^2$, actuates the same to disengage the holding-pawl E' from the locking pawl E. This action allows the spring $e^3$ to throw the pawl E into engagement with the number-wheel as shown in Fig. III, and lock the same against further forward movement. When the key is released and the actuating-bar is thereupon retracted, the stud $b^8$ engages the toggle $f^2$, allows springs $a^6$ to raise the frame and in so rising the rod F lifts the rear end of pawl E and allows the holding-pawl to re-engage and hold it out of engagement with the number-wheel. As previously explained, when the movement of one wheel-mechanism is transmitted to the next for the purpose of carrying tens, the rocker-arm G is actuated by the cam-wheel $D^3$ to release the corresponding holding-pawl and allow the corresponding locking-pawl to engage its number-wheel. Such pawls are, of course, restored by the rod F in the same manner as when they have been released by the action of rod $E^2$.

A suitable top A' is provided with a "sight" $a^{10}$ through which a line of numbers may be read, as will be understood.

It will be observed from the foregoing description of the construction and operation of my improved calculating machine, that such construction is without complication and that such operation is easily effected. Inasmuch, moreover, as accuracy is of the highest importance, I would further call attention to the fact that in this machine the locking movement is commenced before the end of the operative stroke of the actuating means, or, to be definite, between the last stage and the one immediately preceding the same in the movement of such actuating means. The number-wheel is thus sure to stop at precisely the right point in the course of its rotation. I would also refer again to the form of the keys whereby they are adapted to be simultaneously depressed and impelled forward by a single movement of the finger.

Having thus described my invention in detail, that, which I particularly point out and distinctly claim, is:—

1. In a calculating machine, the combination of calculating wheels provided with carrying mechanism; a reciprocatory bar for each wheel connected to rotate the same through an arc proportionate to the amount of movement of said bar; a fixed stop adjacent to the path of movement of said bars; and a series of depressible keys carried by each bar at different points along the same in the direction of movement thereof, and respectively adapted when depressed to engage said fixed stop.

2. In a calculating machine, the combination of a series of calculating wheels provided with carrying mechanism; a corresponding series of manually-reciprocable bars adapted to operatively engage said calculating wheels during one stroke; means normally retaining said bars in a fixed position; a fixed stop adjacent to the path of movement of said bars; and a series of depressible keys carried by each bar at different points along the same in the direction of movement thereof, and respectively adapted when depressed to engage said fixed stop.

3. In a calculating machine, the combination of a series of calculating wheels provided with carrying mechanism; a corresponding series of reciprocable rack-bars adapted on their return stroke to operatively engage said calculating wheels; retractile means normally retaining said bars in a fixed position; a fixed stop adjacent to the path of movement of said bars; and a series of depressible keys carried by each bar at different points along the same in the direction of movement thereof and respectively adapted to be manually engaged to impart a forward stroke to said bars and to be thereby depressed to engage said fixed stop whereby such forward stroke is limited.

4. In a calculating machine the combination of a frame; a series of manually-reciprocable rack-bars mounted therein; a series of depressible keys carried by each of said bars at different points longitudinally thereof; a transverse stop-bar fixed in said frame and adapted to engage said keys when depressed; a series of calculating wheels adapted to be actuated by said bars; means adapted to lock said wheels at the end of the reciprocations of said bars; and means, controlled by said bars, adapted to unlock said wheels at the end of the manually-operated stroke of said bars.

5. In a calculating machine, the combination of a series of calculating wheels; a series of locking-pawls adapted to engage and lock said wheels; a movable frame provided with a transverse member adapted to actuate said pawls to disengage and release said wheels; a series of manually-operable actuating bars for rotating said wheels; and a series of holding-pawls for rendering said locking-pawls inoperative and arranged to be actuated by said bars to disengage the locking-pawls near the end of the bars' manually-operated strokes, said movable frame and bars being connected and arranged to allow the frame to be actuated by the bars to engage and disengage said locking-pawls.

6. In a calculating machine, the combination of a calculating wheel; a manually-reciprocable actuating-bar therefor; a locking-pawl adapted to engage and lock said wheel; a movable frame adapted to actuate said pawl to disengage said wheel; and a toggle having one of its members mounted upon a fixed pivot, the other member being pivoted upon said frame, said bar, being arranged to actuate said toggle to lock and unlock said frame so as to render the same respectively immovable and movable.

7. In a calculating machine, the combination of a calculating wheel; a reciprocable actuating bar therefor adapted to be manually operated in one direction; means tending to operate said bar in the other direction; a locking pawl adapted to engage and lock said wheel; a movable frame adapted to actuate said pawl to disengage said wheel; and a toggle having the outer end of one of its members mounted upon a fixed pivot and the other end of its other member pivoted upon said frame, said bar engaging one of said members and being adapted to actuate the same to move said frame and to thereupon assume a locked position.

8. In a calculating machine, the combination of a calculating wheel; a reciprocable actuating bar therefor adapted to be manually operated in one direction; means tending to operate said bar in the other direction; a locking pawl adapted to engage and lock said wheel; a movable frame adapted to actuate said pawl to disengage said wheel; means normally retaining said frame in position to thus actuate said pawl; and a toggle having the outer end of one of its members mounted upon a fixed pivot and the outer end of its other member pivoted upon said frame, said bar engaging one of said members and being adapted to actuate the same to move said frame against said retaining means and to thereupon assume a locked position.

9. In a calculating mechanism, the combination of a calculating wheel; manually-operable actuating mechansim therefor; a locking-pawl adapted to lock said wheel against rotation in a reverse direction at all times; a second locking-pawl adapted to lock said wheel against rotation in a forward direction; a holding-pawl normally rendering said last-named locking-pawl inoperative and adapted to be actuated by said actuating mechansim to release the same; and means also controlled by said actuating mechanism, adapted to restore said locking-pawl to its inopeartive position.

10. In a calculating machine, the combination of a calculating wheel; a reciprocatory actuating bar therefor adapted to be manually operated in one direction; retractile means adapted to operate said bar in the other direction; a locking-pawl adapted at all times to engage and lock said wheel against reverse movement; a second locking-pawl adapted to lock said wheel against rotation in a forward direction; a holding-pawl normally rendering said last-named locking-pawl inoperative; means adapted to be actuated by said reciprocatory bar at the end of its manually operated stroke to release said locking-pawl from said holding-pawl; and a movable frame adapted, on the retracting movement of said bar, to engage said pawls whereby said holding-pawls are permitted to reëngage said locking-pawls.

11. In a calculating machine, the combination of two adjacent-rotatable calculating wheel-mechanisms adapted to indicate two consecutive orders of numerals; means on the one wheel-mechanism adapted to periodically engage and partially rotate the wheel of the other; a locking-pawl for each wheel; a holding-pawl for each locking-pawl and adapted to hold the latter out of engagement with its respective wheel; and means actuated by the wheel mechanism of lower denomination for periodically disengaging the holding-pawl and holding the locking-pawl of the wheel of higher denomination.

12. In a calculating machine, the combination of two adjacent rotatable calculating wheel-mechanisms, each including a calculating wheel, actuating gear, ratchet and pawl; means actuated periodically by the one wheel for partially rotating the other, and including a cam-wheel and arbor therefor, said cam-wheel provided with studs adapted to engage said other wheel; a locking-pawl for each wheel and spring tending to effect its engagement with its respective wheel; a holding-pawl for each locking-pawl and adapted to hold the latter out of engagement with its wheel; a lever adapted when actuated to knock off the holding-pawl of the locking-pawl of said other wheel, said cam-wheel adapted to periodically engage and actuate said lever; and a spring for actuating said locking and holding-pawls.

Signed by me this 20" day of February 1905.

JOHN C. McLELAND.

Attested by—
  JNO. F. OBERLIN,
  G. W. SAYWELL.